US009819610B1

(12) United States Patent
Crump et al.

(10) Patent No.: US 9,819,610 B1
(45) Date of Patent: Nov. 14, 2017

(54) ROUTERS WITH PERSONALIZED QUALITY OF SERVICE

(71) Applicant: Amazon Technologies, Inc., Reno, NV (US)

(72) Inventors: Edward Dietz Crump, Santa Cruz, CA (US); Matthew Alan Townsend, Redwood City, CA (US); Jon Lewis Lindskog, Seattle, WA (US); Deon Poncini, San Jose, CA (US); Rahul Agrawal, Santa Clara, CA (US); Daniel Christopher Bay, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 184 days.

(21) Appl. No.: 14/465,369

(22) Filed: Aug. 21, 2014

(51) Int. Cl.
| | |
|---|---|
| *H04W 64/00* | (2009.01) |
| *H04L 12/26* | (2006.01) |
| *H04N 7/15* | (2006.01) |
| *H04L 12/927* | (2013.01) |
| *H04L 12/911* | (2013.01) |
| *H04L 12/931* | (2013.01) |
| *G06K 9/00* | (2006.01) |

(52) U.S. Cl.
CPC ........ *H04L 47/805* (2013.01); *G06K 9/00288* (2013.01); *H04L 47/824* (2013.01); *H04L 49/205* (2013.01)

(58) Field of Classification Search
CPC ........ H04W 28/06; H04L 12/26; H04L 12/28; H04L 12/56; H04L 47/805; H04L 49/205; H04L 47/824; G06F 15/173; G06F 15/177; G06K 9/00288
See application file for complete search history.

(56) References Cited

U.S. PATENT DOCUMENTS

| | | | | |
|---|---|---|---|---|
| 7,460,536 | B1 * | 12/2008 | Williams | ................ H04L 47/10 370/392 |
| 9,224,290 | B1 * | 12/2015 | Mason | .................... G08C 17/02 |
| 2006/0025149 | A1 * | 2/2006 | Karaoguz | .......... H04N 21/4126 455/452.2 |
| 2008/0205419 | A1 * | 8/2008 | Shin | .................... H04L 12/2818 370/401 |

(Continued)

OTHER PUBLICATIONS

Royer, User Profile-Based Authorization Policies for Network QoS Services,Seventh IEEE International Symposium on Network Computing and Applications, 2008.

(Continued)

*Primary Examiner* — Chi H Pham
*Assistant Examiner* — Shailendra Kumar
(74) *Attorney, Agent, or Firm* — Pierce Atwood LLP

(57) ABSTRACT

The present disclosure relates to routers and quality of service (QoS) systems and methods that base decisions on the identification of one or more users of computing devices within the environment. Profiles and/or attributes associated with the users may be created and dynamically updated to optimize user experience. For example, the routers may dynamically adapt QoS settings to regulate bandwidth, latency and other parameters to prioritize users and/or optimize a specific user's experience based on the user's priority, personal profile, and/or other attributes.

22 Claims, 11 Drawing Sheets

(56) References Cited

U.S. PATENT DOCUMENTS

| | | | |
|---|---|---|---|
| 2009/0157880 A1* | 6/2009 | Lee | H04L 12/2807 709/226 |
| 2010/0245536 A1* | 9/2010 | Huitema | H04N 7/147 348/14.08 |
| 2012/0166659 A1* | 6/2012 | Hjelm | H04L 47/781 709/228 |
| 2013/0054377 A1* | 2/2013 | Krahnstoever | G09F 27/00 705/14.66 |
| 2013/0208123 A1* | 8/2013 | Lakhani | H04N 7/18 348/159 |
| 2013/0288651 A1 | 10/2013 | Chen | |
| 2014/0003336 A1* | 1/2014 | Padden | H04W 72/10 370/328 |
| 2014/0006026 A1* | 1/2014 | Lamb | H03G 3/10 704/246 |
| 2014/0082156 A1* | 3/2014 | Jagtap | G06F 9/5027 709/220 |
| 2014/0274147 A1* | 9/2014 | Kennedy | H04W 64/00 455/456.3 |
| 2014/0341109 A1* | 11/2014 | Cartmell | H04L 45/308 370/328 |
| 2015/0016247 A1* | 1/2015 | Hayes | H04L 47/127 370/230 |
| 2015/0081448 A1* | 3/2015 | Osotio | G06Q 30/0269 705/14.66 |
| 2015/0163542 A1* | 6/2015 | Kashyap | H04N 21/41407 725/12 |

OTHER PUBLICATIONS

El-Khatib, Selecting the QoS Parameters for Multicast Applications Based on User Profile and Device Capability, Springer-Verlag Berlin Heidelberg, Lecture Notes in Computer Science, vol. 2158, pp. 221-232, Aug. 23, 2001.

* cited by examiner

ROUTERS WITH PERSONALIZED QUALITY OF SERVICE

BACKGROUND

With the advancement of technology, the use and popularity of electronic devices, such as smart phones, has increased considerably. Mobile devices, such as smart phones, are designed to connect to various networks to retrieve and transmit data. However, these networks can be congested which may cause one or more devices to lose connectivity to or experience low throughput on such networks.

BRIEF DESCRIPTION OF DRAWINGS

For a more complete understanding of the present disclosure, reference is now made to the following description taken in conjunction with the accompanying drawings.

DETAILED DESCRIPTION

Figure 1:
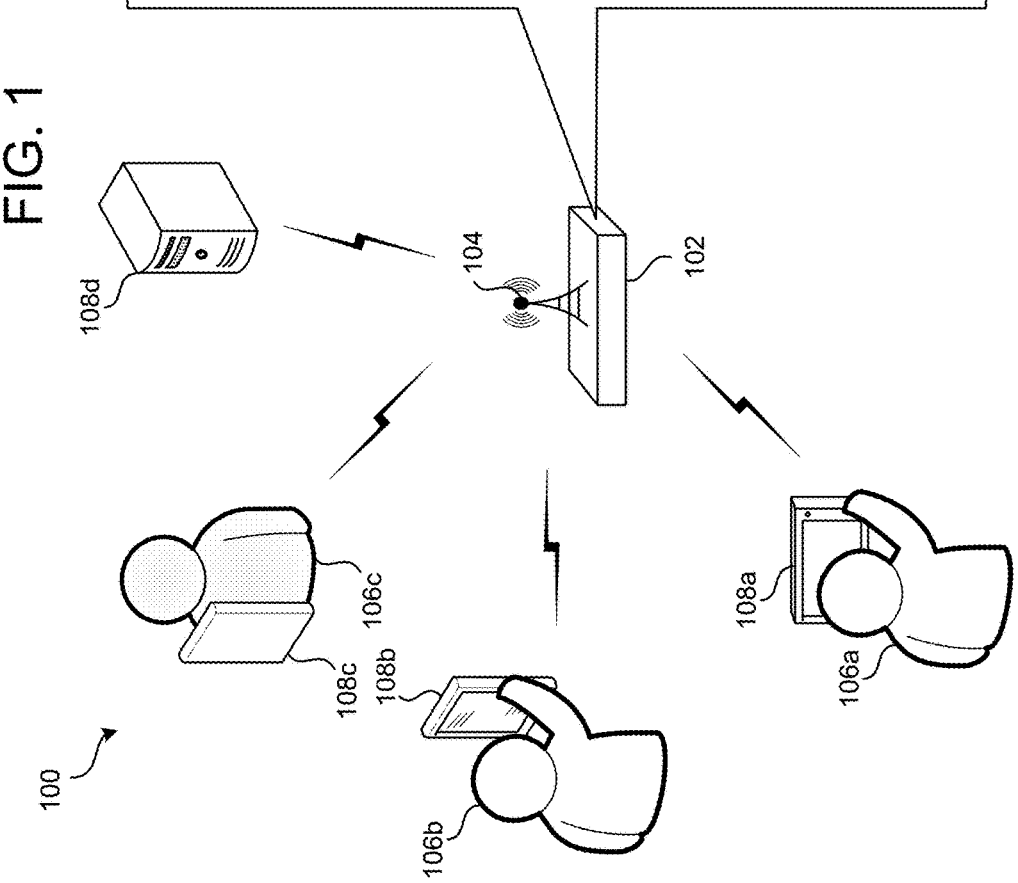
FIG. 1 illustrates an overview of a system for implementing embodiments of the present disclosure.

In general, routers pass data packets between computing devices across a network, such as the internet. The data packets may relate to a variety of purposes, such as data packets relating to web pages, application, audio streams, video streaming, etc. Some routers allow users to customize quality of service (QoS) settings to prioritize applications and other traffic through the router. For example, for certain routers video data traffic may be prioritized over other data traffic. However, these routers generally require the user to manually set the quality of service (QoS) settings by logging into the router via the internet or wired connection. Additionally, these routers are typically unaware of the user associated with the data packet and/or the computing device that is sending or receiving the data packet. The routers are also typically unaware of the preferences or settings associated with each particular user.

The present disclosure is directed to routers and quality of service (QoS) systems and methods that can base routing decisions on specialized QoS parameters that may be configured specifically for each user. Such a system may identify a user of a computing device and attributes associated with the user, and may prioritize certain data traffic for that user based on customized, user-specific QoS parameters. The routers disclosed herein may regulate QoS parameters to prioritize users and optimize a specific user's experience based on the user's priority, personal profile, and/or other attributes. Such user-specific QoS configurations may allow data traffic to be prioritized or otherwise managed in a manner that takes into account a user's identity. Examples of QoS parameters that may be adjusted to coordinate data transfer service among many users include parameters such as bandwidth allotment per user, latency for data transfer to a particular user, data quality (e.g., high resolution or low resolution video) and other parameters. While the discussion below focuses on "user" based QoS configurations, the techniques described may be applied to any device that is serviced by the router, even if the device is not technically associated with an individual human. For example, a network attached storage (NAS) device whose traffic is handled by the router may be associated with its own priority and QoS settings that may be managed by the present system, even though the device may not be associated with a particular human. In such a system each device serviced by the router may be prioritized by the router, though particular devices associated with an individual human user may be prioritized based on the settings and/or configurations associated with that individual whereas non-human affiliated devices may be prioritized based on settings and/or configurations associated with the device itself.

In an example, a home may be equipped with a router that is capable of managing a certain bandwidth of data, where the bandwidth is shared by multiple users residing at the home. With a system employing user-based QoS parameters, data traffic for a first high-priority user (e.g., a parent) may be prioritized over data traffic for a second lower-priority user (e.g., a child). Thus if heavy demands are placed on the home router by multiple users, such as the parent downloading a television program while a child plays video games, the data traffic for the television program of the high-priority parent may be prioritized over the data traffic for the video game of the lower priority child. Another example is prioritizing certain data types over others for certain users (for example, web-browsing data of the child taking priority over television data for the parent, etc.). Another example is prioritizing upload data over download data for certain users/data types/locations. Many other examples and configurations are also possible. The present system offers an ability to configure QoS settings based on user identity and other factors, as explained in detail below.

FIG. 1 illustrates an overview of a system for implementing embodiments of the present disclosure. As illustrated, a router 102 associated with an antenna 104 may communicate with one or more computing devices 108a-d, associated with respective users 106a-c, via a wireless or wired signal. In general, the router 102 directs and passes data packets to the computing devices 106a-106c. The antenna 104 may be co-located with the router or may be in a different location, such as part of a wireless access point that is separate from, but in communication with, router 102.

The router 102 is adapted to apply QoS settings based on the users that are present to optimize the flow of data through the router 102 in accordance with one or more user and/or device profiles. The user and/or device profiles may include information regarding management of data traffic based on a number of considerations, including the identity of the user associated with the data traffic. In this respect, each of the users 106a-c and/or devices 108a-d may have one or more profiles associated with them. The individual profiles may include QoS settings for each specific user and/or device. The QoS settings may include relative priorities for the user and/or device relative to other users and devices as well as relative to different data types. The profile(s) may include user and/or device identification (ID) information, information about the user's behavior and/or history, preferences, adaptive profiles (described further below), and other information relating to a user and the user's data usage. These profiles are described in further detail below and in reference to FIG. 3.

The router 102 may identify the users 106a-c and the devices 108a-d and identify a priority associated with each of the users 106a-c and/or the devices 108a-d, for example based on their respective profiles, illustrated as block 110. This allows the router 102 to determine which QoS settings to implement based on the priority associated with each of the users 106a-c and/or the devices 108a-d, illustrated as block 112. Once the appropriate QoS settings are identified, the router 102 may then apply those settings, illustrated as block 114. The router 102 may then route data traffic or perform other actions in accordance with the applied QoS settings. For example, the router may prioritize traffic/flow of data through the router 102, increase or decrease bandwidth and/or latency for one or more of the users 106a-106c or a specific device, such as the device 108d, or the like, all in accordance with the implemented QoS settings. In other aspects, the QoS settings may prioritize automated systems and other systems and devices using the router 102, such as backup systems, for example illustrated as 108d.

Figure 2:
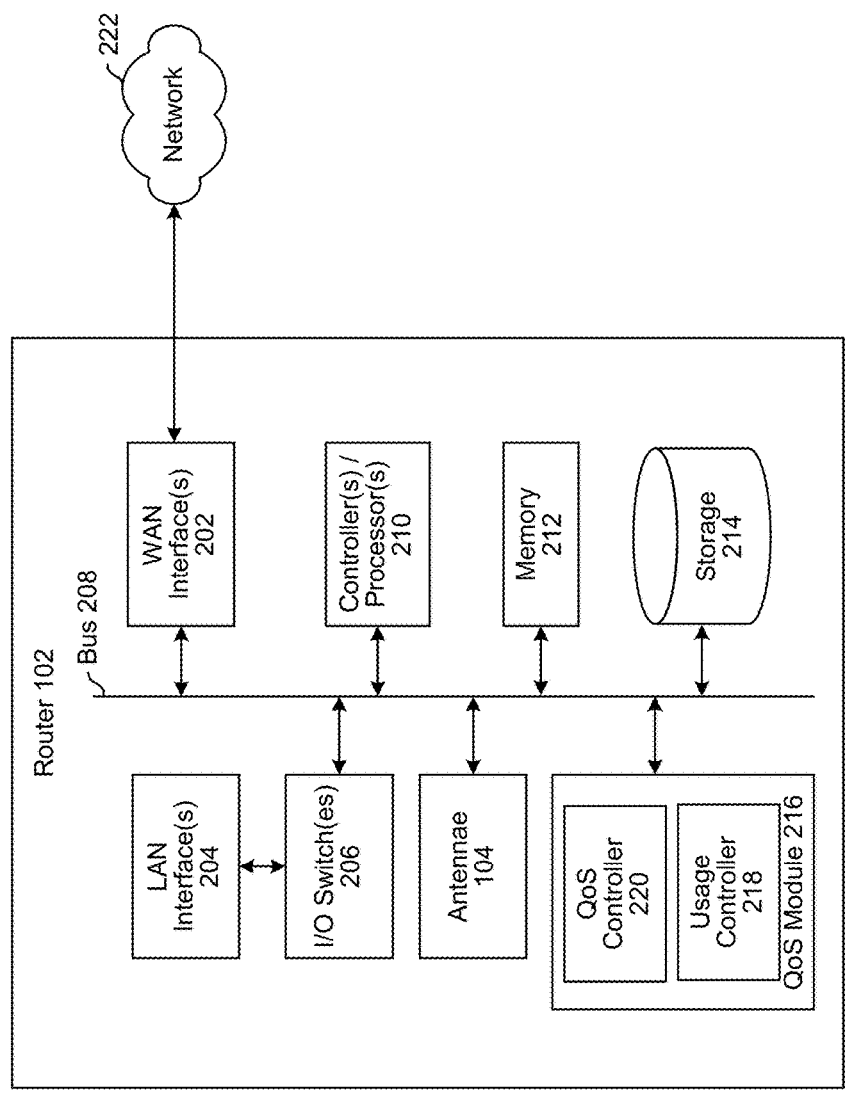
FIG. 2 is a block diagram conceptually illustrating example components of a router according to embodiments of the present disclosure.

Aspects of the present disclosure may be implemented by a router. FIG. 2 illustrates an exemplary router 102. The router 102 may include one or more wide area network (WAN) interfaces 202, and local area network (LAN) interfaces 204 coupled to one or more I/O switches 206. The WAN interface(s) 202 and LAN interface(s) 204 may be in communication with a variety of other components over a system bus 208 or through a direct connection. The WAN interface(s) 202 enables the router 102 to communicate and receive data, control signals, data requests, and other information with and from other resources including computers, data sources, storage devices, and the like, on a network 222, such as the internet. The LAN interfaces(s) 204 may be used to pass data packets to devices in the appropriate LAN, as directed by the I/O switch(es) 208. As appreciated by those skilled in the art, the WAN interface(s) 202 may be configured to communicate via wired or wireless connections. As one skilled in the art should appreciate, the router 102 may receive an audio, image, video, and other inputs and transmit the input data to another computer, a storage device, or other source via the LAN interface(s) 204, as well as save the input data to a networked location.

The router may also include one or more controller(s)/processor(s) 210 that implement the protocols and settings of the router 102, including the QoS settings. The other components may include, for example, a memory 212, a storage 214, and the antenna 104 for use in wireless transmission of the data packets. The processor 210 may be configured to operate in accordance with programming instructions stored in the memory 212. The memory 212 generally comprises RAM, ROM, and/or other memory. The memory 212 may also store user-executable applications and modules, or programs, for conducting various functions on the router 102. For example, the memory 212 may include instructions associated with a QoS module 216 to configured the router 102 according to aspects of the present disclosure to implement user and device based QoS settings based on identified user(s) and device(s). The storage 214 may store profiles associated with users interacting with devices and/or devices themselves, whose data is handled by the router.

The QoS module 216 may include a usage/traffic controller 218 and a QoS controller 220. The usage/traffic controller 218 may be adapted to monitor and store, for example, in storage 214, traffic and data usage associated with each user and/or device in accordance with the appropriate profiles. The QoS controller 220 may be configured to implement the appropriate QoS settings, based on the identified user(s) and/or devices. The function of identifying the users and/or devices, processing the profiles, and/or adapting the QoS settings may be implemented in the router 102, in a plurality of cooperating applications/modules on the router 102, or in a plurality of cooperating applications and/or modules distributed over multiple devices in a computer network, as further described below with reference to FIG. 4, for example.

In one example, there may be a setup and initialization of the router 102 when the router 102 is initially installed. In this respect, there may be a series of questions or prompts to a user that the user may answer, or the user may otherwise input information used to initialize and configure the router. For example, the user may identify locations of non-mobile devices (such as a desktop computer, wireless access point, etc.), setup the user ID (for example, by providing a username and password, a picture of the user, a voice fingerprint, etc.), configure QoS preferences or settings, and otherwise configure the router 102.

Figure 3:
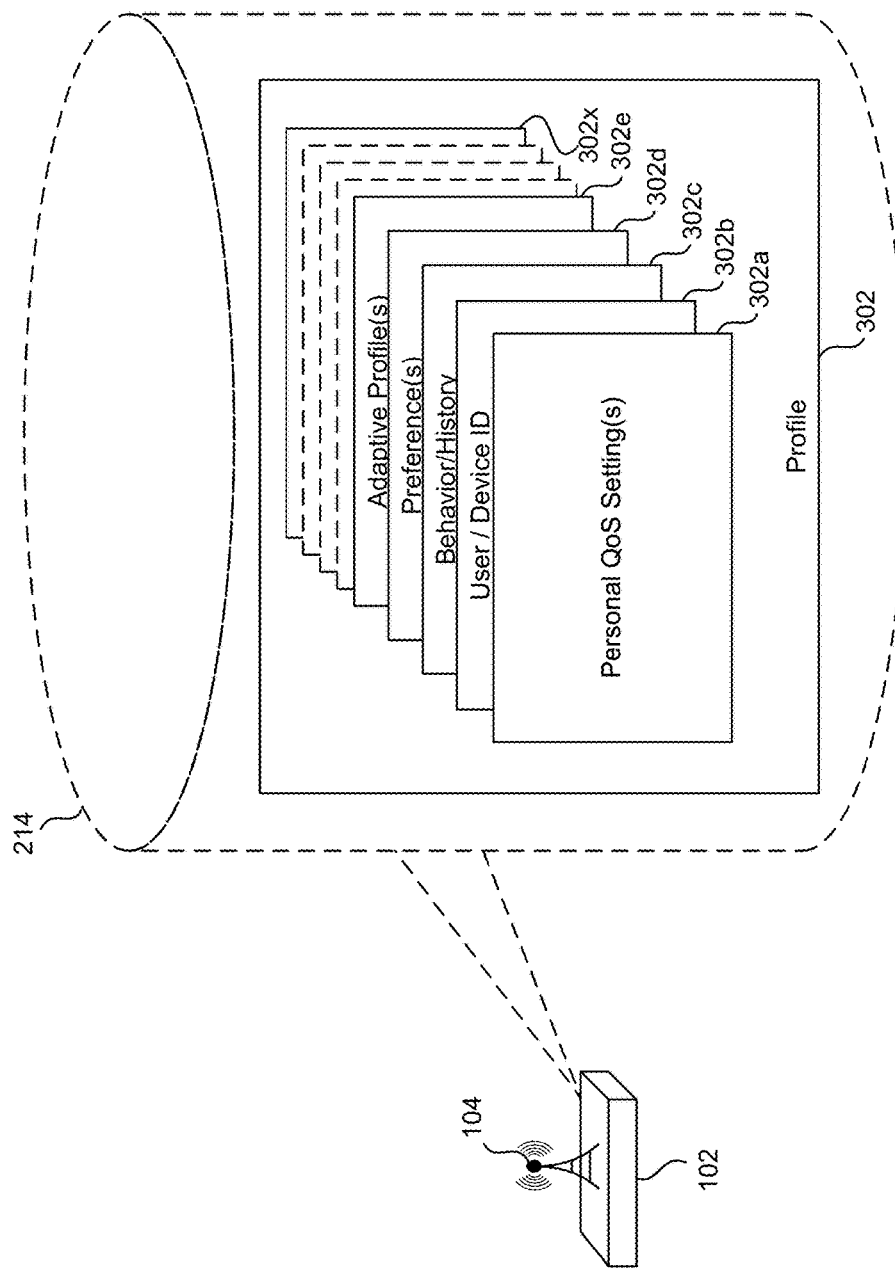
FIG. 3 illustrates exemplary profile and settings according to embodiments of the present disclosure.

FIG. 3 illustrates an exemplary profile 302 and associated settings and information according to embodiments of the present disclosure. Although a single profile 302, for example for a user or device, is illustrated, many profiles may be stored in router storage 214. As described above, the profile(s) 302 may include personalized QoS settings 302a, user and/or device identification information 302b, information about user behavior and/or history 302c, user preference(s) information 302d, adaptive profile information 302e, and other information 302x relating to a user and the user's data usage.

The personal QoS settings 302a may include settings and/or configurations to be used by the router 102 when routing data packets to a device currently being used by the user. The QoS settings 302a may include one or more priority indicators for the respective user, which may be absolute priority indicators (for example, a priority value according to a certain scale, i.e. 7 out of 10) or may be priority indicators relative to other user(s) of devices accessing the router (for example, lower than user A but higher than user B). The priority indicators may be dynamic and may change based on user input configurations (e.g., a user administrator telling the router how certain users should be prioritized), system initiated configuration changes (e.g., determining the presence of a new high-priority user of the router and therefore reprioritizing the other users), or the like. The QoS settings 302a may also include priority indicators that are based on, a device accessing the router, the device and the user, the user and the data type, etc. For example, download video data for user A may be higher priority than download gaming data for user B which in turn may be higher priority than upload video data for user A. QoS settings 302a may also include priority indicators based on location, such as data requests originating from a home office are to be prioritized over data requests originating from the home's basement, etc. Generally known techniques for indoor location determination may be used to determine location of devices within a home.

The QoS settings 302a may include information such as upload and/or download bandwidth allotment(s) per user and/or device. For example, the QoS settings may provide a first user of a first device a higher allocation of bandwidth as opposed to a second user of a second device. In general, bandwidth is a measure of the rate available for downloading, uploading, and/or consuming data. The QoS settings may also include information relating to an absolute upload and/or download bandwidth, that is the bandwidth a user should not exceed. The QoS settings may also include allocations of throughput, that is the amount of data that is actually transferred during a certain period of time. The QoS settings may include a throttling priority and/or a throttling percentage of bandwidth, that is measurements of how the bandwidth allocation to a user should change in the presence of other users. The QoS settings may also indicate how and under what circumstances a user's throughput or bandwidth may be throttled (i.e., limited). The QoS settings may also include blocking rules, for example to restrict access to certain users to one or more websites, etc. The QoS may also include other parameters or metrics used to divide router resources among users of the router 102. The users of the router may include devices associated with individuals (such as devices 108a-108c) or devices not associated with particular individuals (such as device 108d). The QoS settings may be based on other information stored in the profile 302, such as the information described below.

For example, latency is a metric of how much time it takes for data to be transferred. Latency is a function of, among other things, an order in which data packets are sent (and acknowledged) over network. Transmission control protocol/internet protocol (TCP/IP) is a protocol used by applications for message delivery. If a packet is dropped using TCP/IP, it may be retransmitted a number of times to ensure delivery. Such retransmissions may interfere with other communication attempts. Thus, if a first user has latency priority, then data from the first user may be prioritized over data from a second, lower priority user, even if the second user has more data to send because the first user has latency priority. Data from the second user may be deferred or maybe even dropped due to bandwidth conditions to ensure delivery of the data from the higher priority first user.

The profile 302 may include information regarding a user's and/or a device's ID 302b. The ID information 302b may include an identification number (such as a unique number) associated with the user for system tracking purposes. The ID information 302b may also include information such as a login and password that may be used to identify a user. The ID information 302b may also include information such as devices known to be used by a specific user (i.e., IDs associated with the user's phone, tablet, wearable device associated with the user, etc.). The ID information 302b may also include personal attributes (such as biometric attributes like fingerprints, heartbeat, etc.), that may be detected by a device and passed to the router so the router may identify the user. Such attributes may be identified using video identification techniques (such as facial recognition), audio identification techniques (such as voice recognition), or other techniques performed by one or more devices communicatively connected to the router (or by the router itself using information gathered by the one or more devices).

The user profile 302 may include information regarding a user's behavior (i.e. what the user is doing), location, and/or history 302c as they relate to the router 102, specifically with regard to device/data usage. The user behavior information 302c may include information regarding times, locations, and devices associated with data routing for the particular user. The behavior information 302c may indicate, for example, the location within the home network where users of devices tend to consume data, that a particular user typically streams a particular episode of a television program between the hours of 7 p.m. and 10 p.m. during weeknights using a tablet device while in the living room of a home, etc. Other information may also be stored as behavior/history information 302c.

In another example, a first user may regularly head home from work, and upon his/her return, watch a particular program at approximately 6:00 PM. Instead of the first user turning on his/her device and experiencing a problem downloading the program (for example, due to low bandwidth caused by other router activity in the home), the router identifies the first user when the user arrives at home and based on the first user's profile and/or attributes adjusts its QoS setting(s). In this example, the first user has the highest priority and most important use of bandwidth in the home at that time. When the first user is identified, for example, when the first user is in proximity to the router 102, enters the home, and/or turns on the television, the router 102 changes the QoS setting(s) to increase the bandwidth to allow the first user to watch the particular television program without experiencing a problem downloading and watching the television program. In this respect, the router 102 may automatically, upon identification of the first user, begin downloading and pre-caching the television program for the first user. Similarly, when the first user is not in the home, the QoS setting(s) may change based on other users in the home and the profiles and/or attributes associated with those users.

The user profile 302 may include information regarding user preference(s) 302d. The preference information 302d may include, for example, a particulars user's preference to prioritize movie data over gaming data. Another user may prioritize email data while at one location (such as a home office) but may prioritize video data at another location (such as a living room). Another user may prioritize continuous of delivery of certain data (such as preferring to receive lower quality video data rather than experience a buffering delay) whereas another user may prioritize quality of data (such as requesting highest resolution video, even if waiting for such data may result in buffering delays). Various other preferences are also possible.

The user profile 302 may include information regarding adaptive profile(s) 302e. The adaptive profile(s) 302e may include information used by the router 102 to adapt to different communication conditions when managing data for the respective user associated with the user profile 302. For example, the adaptive profile(s) 302 may include information used to predict user activity (for example based on the user behavior/history information 302c and/or preferences 302d) and/or adapt to user activity when exchanging data with the router 102. For example, when a user starts to change location in a home, knowing that the wireless application protocol (WAP) signal strength is going to decrease, the router 102 may proactively adjust QoS parameters (such as quality of video data requested) to prevent buffering. For example, as the user moves from one room to another in the home, knowing that the WAP signal strength may decrease, the router 102 may lower the quality of video data to prevent buffering.

The router 102 may also understand the location and strength of wireless access points in a particular home service set identifier (SSID), and suggest and configure the wireless access points and/or router 102 to maximize performance. For example, the router 102 may include a RF network profile tool that allows a user to optimize placement of a router 102/WAP, based on signal strength, in the users home, office, etc. The tool may understand where each family member or colleague tends to use a device and consume content, and knows each user's QoS priority. This allows the location of the router 102 to be optimized based on the users' connected to the router 102. In one example, a user may use a user device, such as a cellular or mobile communication device, to optimize the location of the router 102/WAP in his/her home, office, etc.

As described above, the router 102 may monitor and store user data associated with each user and use the data to anticipate, adapt, and predict future data access. Information regarding the user's preferences and/or historical device operating behavior may be used to pre-cache data expected to be accessed or consumed in the future and/or schedule pre-caching/download operations to be triggered based on user profiles and/or attributes. This data may be stored on the router 102 or on a remote device (for example, a server or network addressable storage (NAS) device).

Figure 4:
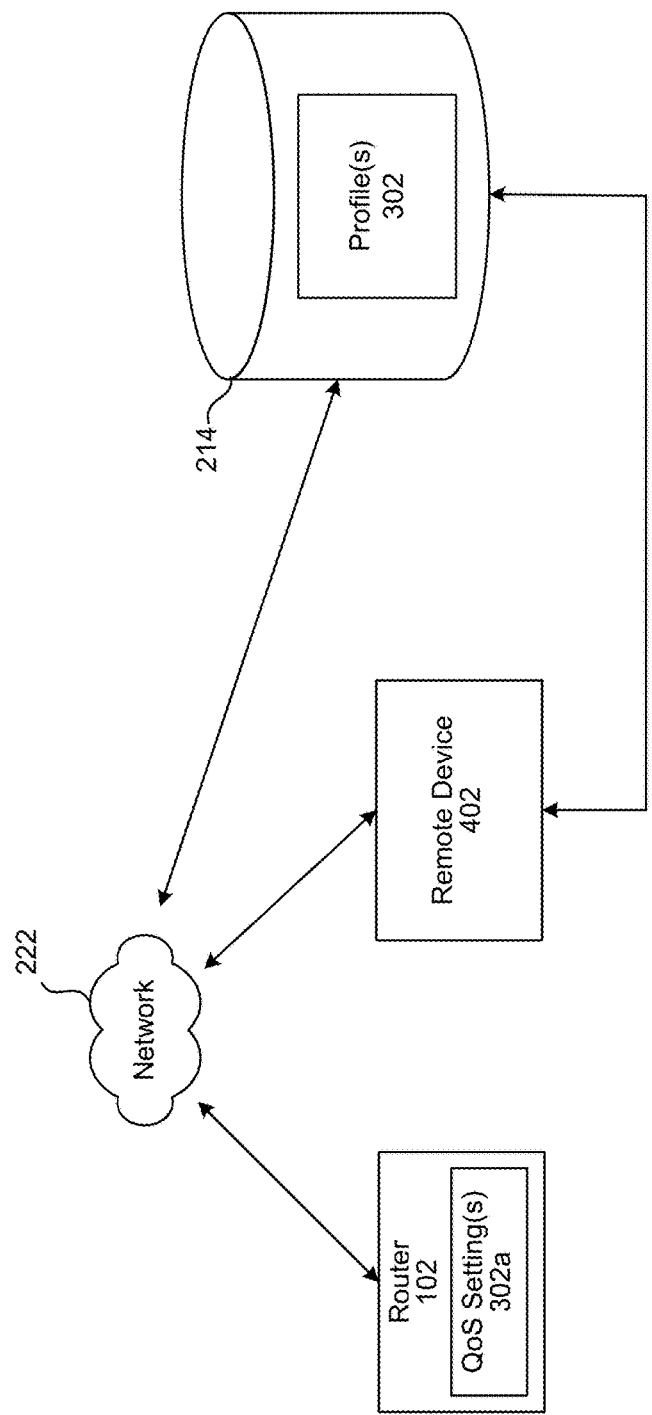
FIG. 4 illustrates an exemplary distributed computing environment according to embodiments of the present disclosure.

Multiple devices may be connected over the network 222 through either wired or wireless connections. One configuration of a distributed environment according to the present disclosure is illustrated in FIG. 4. In this configuration, the router 102 may receive or generate the QoS settings 302a (for example, via a wireless access point) based on the profile(s) 302 stored in storage 212. In this configuration the storage 214 is external to the router 102 and accessible by the router 102 over the network 222. In this respect, the router 102 may upload data to and retrieve data from the storage 214.

A remote device 402 may also be in communication with the router 102 over the network 222. In this embodiment, the remote device 402 may include the storage 214 or access the storage 214 (either located separately as illustrated or on the router 102) via the network 222 or a wired connection. The network 222 may be a wide area network such as the internet, a local area network, a network allowing physical connection of the devices, a wireless communication network, or other suitable connection between the devices including a direct (wired or wireless) connection.

In one aspect, the remote device 402 may analyze the data (i.e., information 302b-302x stored in user profile(s) 302) in storage 214 and generate the QoS settings 302a. The remote device may then communicate the QoS settings 302a to the router 102 for implementation. In another aspect, the remote device 402 may analyze the data in storage 214 and send an analysis of the data to the router 102, and the router 102 may generate or adapt the QoS settings 302a. In some implementations, the router 102 may have limited storage. In this respect, such a distributed environment may compensate for that limited storage by storing the data on another device accessible by the router 102.

In another embodiment, user profile(s) and related information may be stored in multiple locations. Profiles of users that are currently being serviced by the router 102 may be stored at a local storage associated with the router 102. When a new user of the router 102 is identified, the router may communicate with the remote device 402 to obtain the profile for that user. The router 102 may then store that profile locally, and if necessary, update the profiles of other users and/or devices serviced by the router 102 to account for different activity priorities/configurations given the new user. The router 102 may also store user profiles for users that commonly use the router and may only activate QoS configurations associated with those users when the router determines that those users are present and are routing data traffic through the router 102. Profiles stored with the router 102 may be synchronized with profiles stored remotely so that both locally stored and remotely stored profiles may be kept current. In another embodiment the router 102 may only store parts of certain profiles (for example, user ID information 302b) and may use that information to identify and obtain further profile information from remote device 402 at appropriate times, such as when particular users are detected by the router 102.

Figure 5:
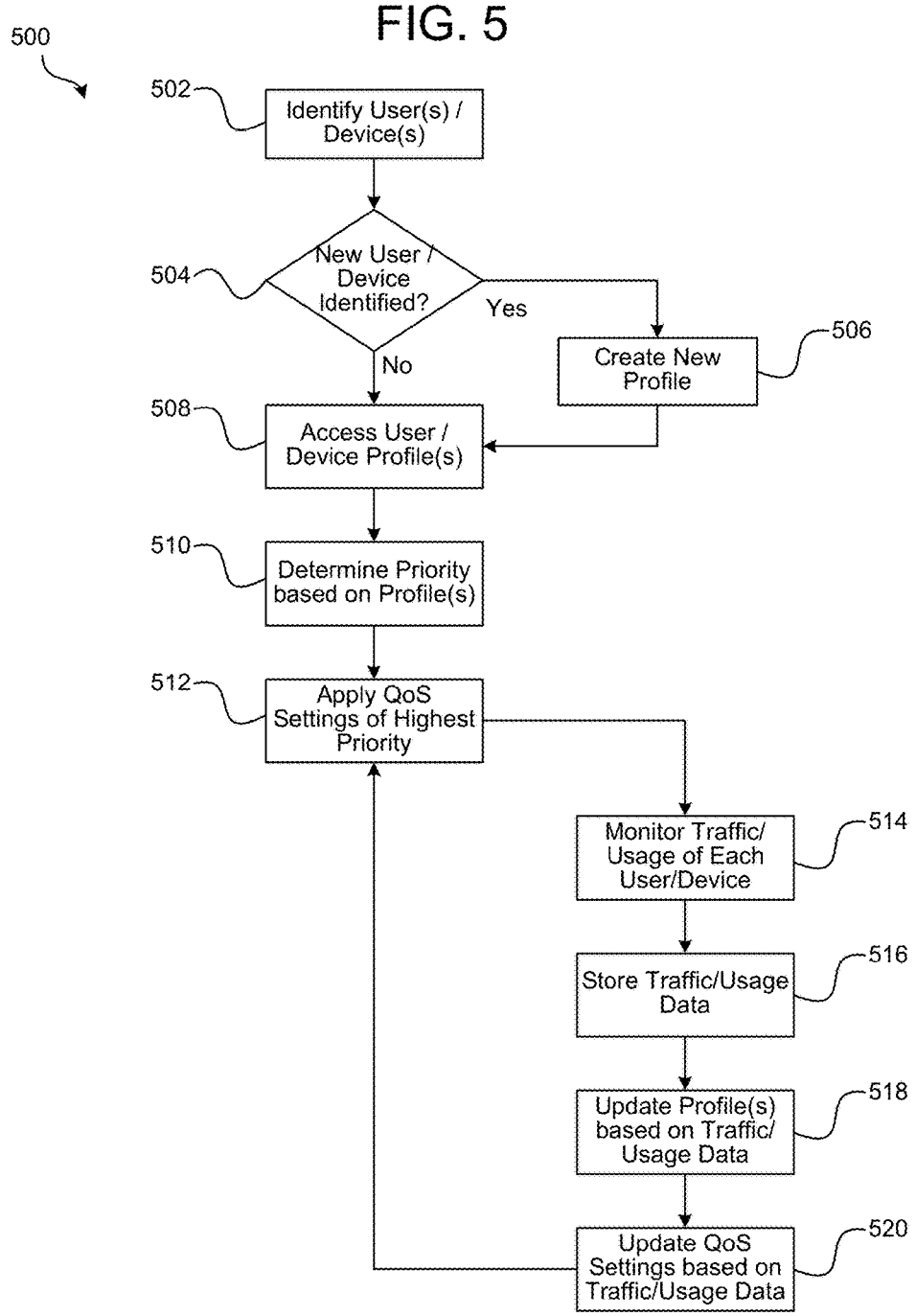
FIG. 5 illustrates a functional block diagram of a method of identifying users and adapting settings based on the user(s) according to embodiments of the present disclosure.

In one embodiment, the devices, systems, and methods disclosed herein provide a router that is capable of providing personalized QoS based on an identification of the present user(s) and device(s) connected to the router. One or more of the logical components of FIGS. 2-4 may perform the methods described herein. FIG. 5 is a flow diagram illustrating an exemplary method for implementing aspects of the present disclosure. In block 502, present users and devices in communication with and/or connected to the router are identified. The user device and/or electronic device may be any device, for example, having one or more of a camera, microphone, biometric input device, display, etc., such as a computer, television, video camera, mobile phone, and any other device capable of connecting to the router. The user(s) may be identified based on a user identification, for example, user ID information 302b associated with the user profile. The user identification may be based on a video identification such as facial recognition (using, for example, camera(s) associated with the user device or camera(s) otherwise communicatively connected to the router 102), an audio identification (such as a spoken password or recognizing a user's voice, for example through voice fingerprinting), other biometric identification (i.e., fingerprint), personal identification number (PIN), password, etc.), an identifier of the user's device, or other identification. The information used to identify the user(s) may be input or collected by a user device and/or other electronic device in the vicinity of the user and passed to the router to allow the router to identify the user(s) and the associated user profile(s).

Upon identifying the user(s), a determination is made as to whether any user and/or device is a new user or device, illustrated as block 504. If one or more users or devices is a new user or device, a new profile, for example, including all or some of the information described above is created for the new user or device, illustrated as block 506. When the user or device is not a new user or device, the system may identify and access an existing profile associated with the identified user and/or device, illustrated as block 508. A priority associated with the user and/or device is identified, illustrated as block 510. In this embodiment, the priority level may dictate which QoS settings will be applied by the router. For example, the QoS settings of the user having the highest priority level may be applied and the router will operate in accordance with those settings, illustrated as block 512. In another example, the QoS settings of multiple users may be considered by the router, with the router adopting one or more QoS settings so as to ensure the proper allocation of router resources (such as bandwidth, latency, etc.) among the different priority users, tasks, etc.

Additionally, the traffic or usage data associated with each user, for example, via the user device or other electronic device, may be monitored, illustrated as block 514. For example, a number of page refreshes, pausing a video to allow for buffering, a time when the user accesses certain content via the device, and other parameters may be monitored. This data may be stored, for example, in the storage 214 described above, illustrated as block 516. The traffic or usage data may also be used to update one or more of the profiles for example, information 302*b-x* in the profile 302 described above. In one implementation, this data may be incorporated into the behavior information 302*c* to indicate the user's behavior. For example, it may be indicated that a user routinely watches a certain television program every day at about 6:00 PM. When the user profiles are updated as illustrated in block 518, the personalized QoS settings for each user may also be updated based on the traffic or usage data, illustrated as block 520. For example, in one implementation, if an expected user action does not take place (such as the user skipping the downloading of the expected television program) the QoS settings may be updated to re-allocate priorities and/or router resources to other tasks/users.

The appropriate updated QoS setting may then be applied or implemented, illustrated as block 512. For example, if a first user's QoS settings are currently being applied, and they are updated based on the traffic or usage data, the updated QoS settings of the first user may be applied, for example, in real-time.

Figure 6:
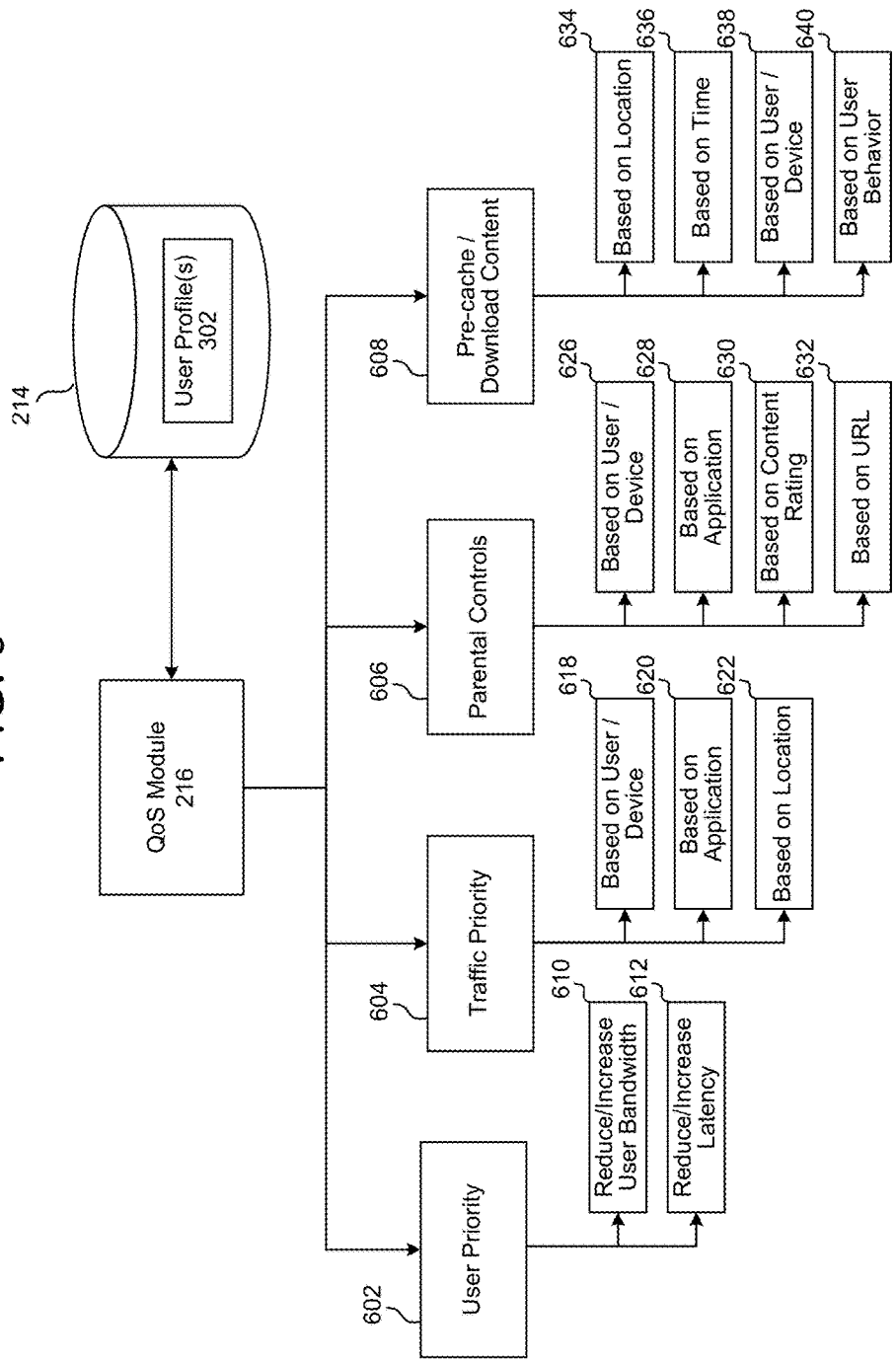
FIG. 6 illustrates exemplary settings according to embodiments of the present disclosure.

FIG. 6 illustrates some exemplary categories and types of settings that may be configured by a QoS module 216 in communication with storage 214 containing various user profile(s) 302. The QoS module 216 may consider the various information contained in the user profile(s) 302 and the activity of the users to configure behavior of the router to prioritize data among users and perform other operations such as implementing parental controls, pre-downloading content, or other actions. The examples of FIG. 6 are intended to be illustrative rather than exhaustive and other examples are possible. Based on the identity of the active users, their current behavior, and the information in their respective user profile(s) 302, the system may perform various operations.

In one example, the system may determine the user priority 602 of various users of devices in communication with the router 102. For example, from their respective user profiles the QoS module 216 may determine the relative priority of the active users of devices communicating with the router 102. The QoS module may increase or decrease bandwidth (610) allocated to users of the devices and/or latency (612) for certain users of the devices based on user priority levels and the capability of the individual router 120. User priority may be based on user configurable settings, system configurable settings, or other factors. For example, a user may be associated with a particular members only service recognized by the router and may receive higher priority service as a result. This may result in different configurations for the user at the router 102, or may involve the router 102 indicating to a different device, such as a remote server, to prioritize particular data traffic for the user of the device.

In another example, the system may determine the traffic priority 604 of various kinds of data traffic managed by the router 102. For example, from the user profiles, or other data settings available in storage 214 or elsewhere, the QoS module 216 may determine the relative priority of different data types. The relative priority may depend on the user and/or devices (618) associated with the data, the application (620) for which the data is intended, the location (622) the data is being sent to or other factors. For example, certain data types (such as streaming video) may generally be prioritized higher than other data types (such as gaming data). In another example, more commonly used applications may have a higher priority than other applications. In another example, data being sent to devices in certain locations (such as a home office) may be prioritized over data in other locations (such as a living room). The prioritization based on location may be based on the signal strength available to each particular location.

In another example, the system may use information in the user profile(s) 302, or in other settings available to the router 102 to perform other functions. Illustrated in FIG. 6 are two such functions, parental controls 606 and pre-caching/downloading of content 608, though other functions are also possible. Parental controls 606 may be directly configured by an adult user for other child users or may be configured by the system, such as by the QoS module 216, based on information available in the profile(s) 302 or elsewhere. The category of parental controls 606 may include settings that restrict access to certain content and other areas. There may be a setting that restricts access based on the user and/or devices (626). For example, a parent may restrict a child's access. There may be a setting that restricts access based on the application 628. For example, a parent may block or restrict access of other users of devices to certain applications. There may be a setting that restricts access based on content rating (630). For example, access to certain content having certain ratings may be restricted or blocked. There may also be a setting that restricts access to certain URLs (632). For example, access to URL's known to include explicit content or viruses may be restricted or blocked. Other configurations of restrictions are also possible, such as allowing access to certain materials by location, such as restricting content available to a child using a device in the child's bedroom whereas the child using the device is permitted to access more content in an area where the child can be supervised by the parent, such as the living room. The child using the device may also be permitted access to more content on a public device, such as a television, than on a private device, such as the child's phone.

In one embodiment, the QoS module 216 may be configured to pre-cache or pre-download (608) content for consumption by the user at a later time. The content may be downloaded prior to an expected time at which the user will consume the content (for example, downloading a television episode prior to the user's expected viewing). The QoS module 216 may determine certain content to pre-download based on information available in the user profile(s) 302 or elsewhere. Pre-downloaded content may be stored on storage 214, on other storage accessible by the router 102, or elsewhere, such as on a user device, even if the user is not currently using the device and/or not currently requesting to view the content being pre-downloaded. The pre-cache/download content 608 may include settings that base the pre-caching/downloading of content on location (634) of the user within the limits of the LAN. For example, if the signal strength of the LAN is low in certain areas of the LAN, content may be pre-cached/downloaded in anticipation of the user moving to one of the location having low signal strength. There may be a setting that bases the pre-caching/downloading of content on time (636). For example, if a user routinely watches a certain television program at a certain time, content may be pre-cached/downloaded prior to that time to provide prevent the user from experiencing downloading/buffering delays. The pre-caching/downloading of content may be based on the user and/or devices (638). For example, content may be pre-cached/downloaded for a user of higher priority over a user having a lower priority. The pre-caching/downloading of content may also be based on the user's behavior (640). For example, if the user of the device tends to use more bandwidth at a certain time, the bandwidth may be increased for the user of the device and decreased for other applications and/or users of devices at that time.

All of these settings may be applied individually or merged and applied in a consolidated fashion. Additionally, these settings may change dynamically based on the behavior of the user(s) to optimize the operations of the QoS module 216. The settings may be manually input and set by the various users acceding his/her profile and/or automatically set by the router or other device in communication with the router based on monitoring the behavior of the users.

Figure 7:
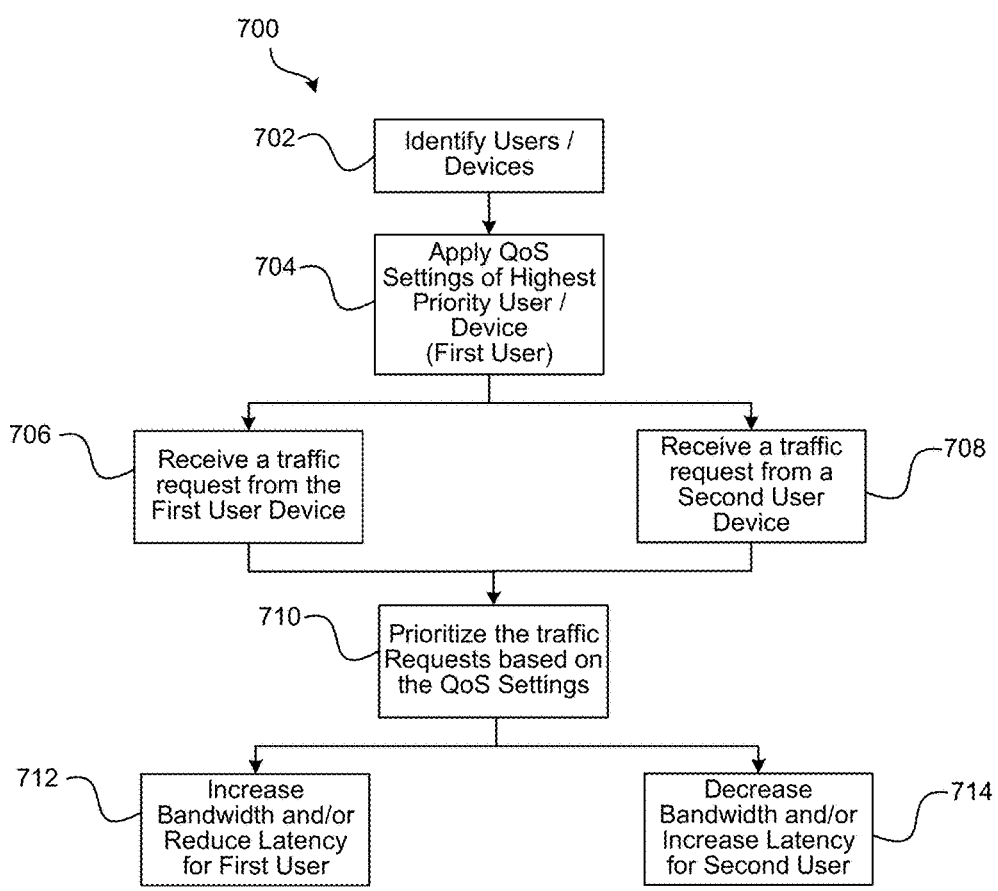
FIG. 7 illustrates a functional block diagram of a method of prioritizing traffic based on user(s) according to embodiments of the present disclosure.
Figure 8:
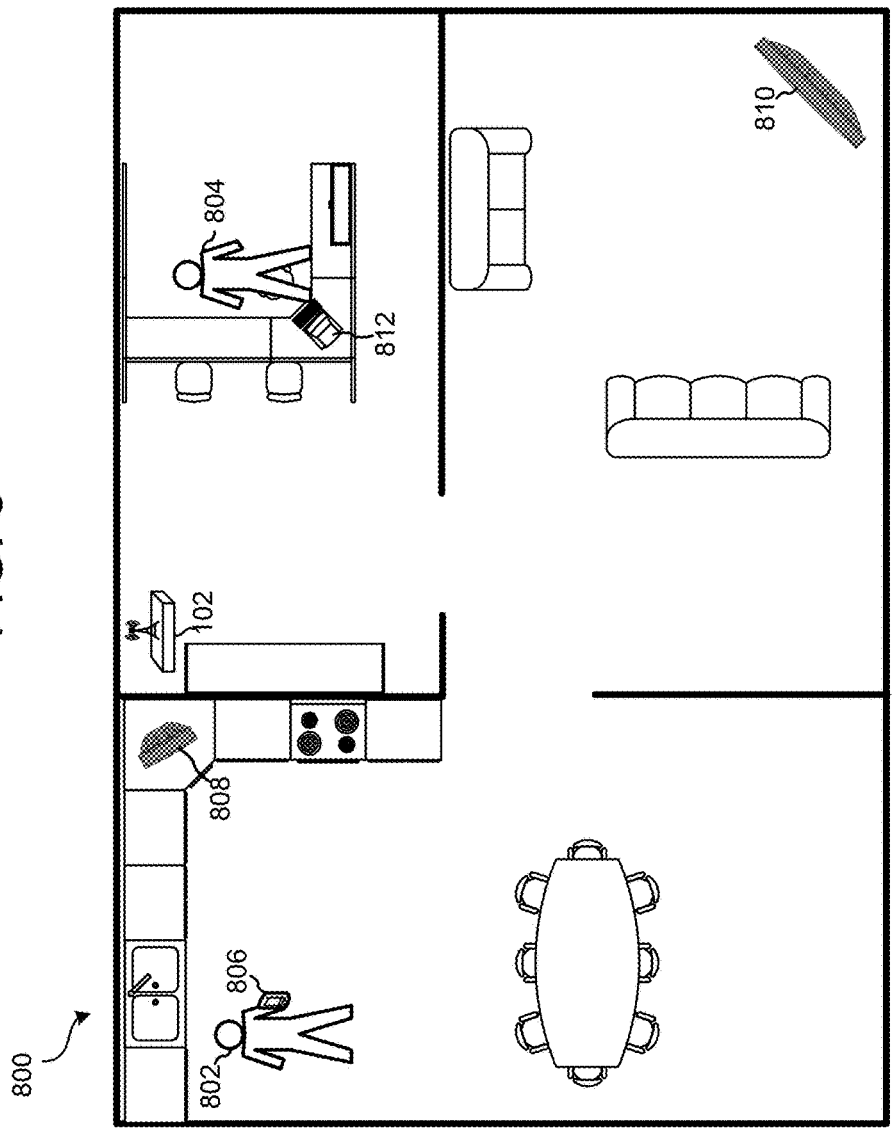
FIG. 8 illustrates an exemplary environment of implementation according to embodiments of the present disclosure.

FIGS. 7 and 8 illustrated an example of a method 700 and an environment 800 in which personalized QoS settings of a user may be implemented and operate based on the profile(s) and attributes and the identity of the user and/or the device. In this example, the QoS settings of a first user 802 (e.g., a parent) are implemented over QoS settings of a second user 804 (e.g., a child). The system may identify the users and/or devices within the home, illustrated as block 702. In this example, the first user 802 and the second user 804 are identified as users of the router 102. As described above, the users may be identified by one or more user devices or other devices within the environment 800, such as, a computer, television, video camera, mobile phone, wearable indicator, and any other device capable of connecting to the router. The identification may be by way of a video identification (e.g., facial recognition), audio identification, biometric identification, personal identification number (PIN), password, etc. The identification of the user (702) may also include associating the identified user with one or more devices being operated by the user. Thus, the system may determine that a data request originating from device 806 (or 808, 810, etc.) is associated with the first user 802 rather than the second user 804 (or other user). Thus the router 102 may prioritize data requests from the device associated with the first user 802 over other data requests from other devices.

When the first user 802 is identified, for example, when the first user 804 enters the home, the router may change the QoS setting(s) and apply the QoS settings for the first user 802 (i.e., the user with the highest priority), illustrated as block 704. For example, the router 102 may configure QoS settings that provide the first user 802 with more bandwidth than the second user 804. Thus, when a first data traffic request is received from a first device 806 being operated by the first user 802, illustrated as block 706, and a second request is received from a second device 812 being operated by the second user 804, illustrated as block 708, the requests may be prioritized based on the QoS settings, illustrated as block 710, to prioritize the first request over the second request. For example, the first user 802 may desire to watch a video on device 806, 808 and/or 810 within the home, while the second user 804 is playing a game on device 812. In this respect, the router may automatically increase the bandwidth and/or reduce latency for the first user 802, illustrated as block 712, while at the same time decreasing bandwidth and/or increasing latency for the second user 804, illustrated as block 714, in accordance with the QoS settings and the capabilities/resources of the router 102. Similarly, when the first user 802 leaves or is not in the home, the QoS setting(s) may change based on other users (i.e., the second user 804) still present in the home and being served by the router 102. In this example, the router prioritizes the operations of the first user 802 so the first user 802 can use a device without experiencing delays.

Figure 9:
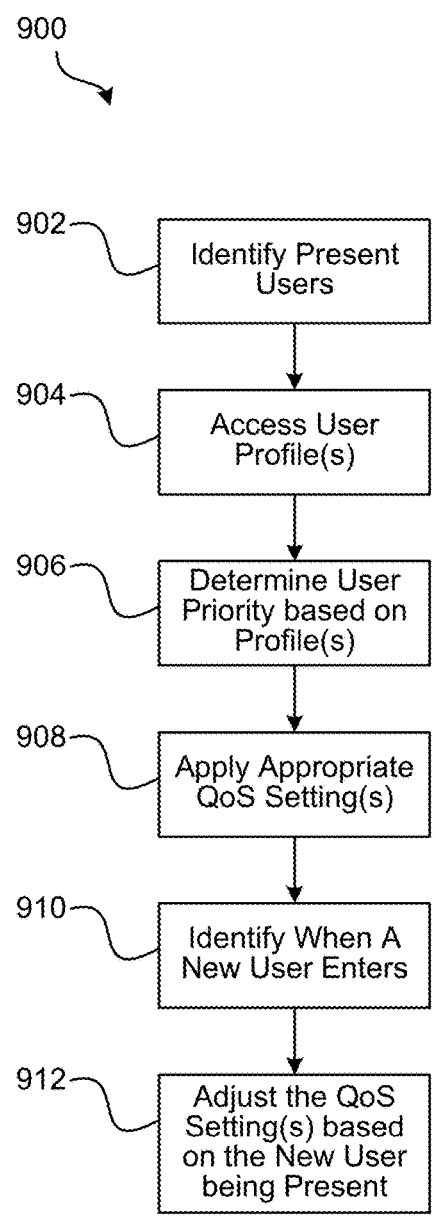
FIG. 9 illustrates a functional block diagram of a method of adapting settings based on user presence according to embodiments of the present disclosure.

In another example, the QoS setting may change or adapt to a user entering the environment or a certain location within the environment or otherwise desiring to receive/send data through the router. FIG. 9 illustrates a functional block diagram of another method 900 of adapting QoS settings based on user presence according to embodiments of the present disclosure. In block 902, the users that are present in the environment may be identified. The profile(s) of the present users may be accessed, illustrated as block 904, and a priority associated with each user may be identified, illustrated as block 906. The QoS settings of the user having the highest priority level may be applied, illustrated as block 908.

In this example, a new user enters and the QoS setting dynamically change. For example, when a new user enters the environment, the new user is identified, illustrated as block 910, and the QoS setting are automatically adapted based on the new user being present, illustrated as block 912. This type of operation may be desired in a parental control situation, for example, when the new user is a child and the child is entering a location in the environment in which a rated R movie is playing. In this respect, the router may identify that the child is entering the location and automatically stop, delay or pause delivery of the data packets to cause the movie to stop playing.

In another example, when the system detects a user leaves the environment (or no longer operating a device in a manner that requests data from the router 102), the QoS settings used by the router 102 may change in accordance with the behavior of the user and/or user profile(s) of the remaining user(s). For example, when a user is operating multiple devices, such as watching the TV and working on a laptop at the same time, the user's attention may be tracked (for example, using cameras and/or microphones of the devices) to determine which device should receive higher QoS priority. An example may include when the user streaming video on the TV but the user's attention is focused on the laptop (for example as determined by a built-in laptop camera), the data needs of the laptop may be given higher priority.

Figure 10:
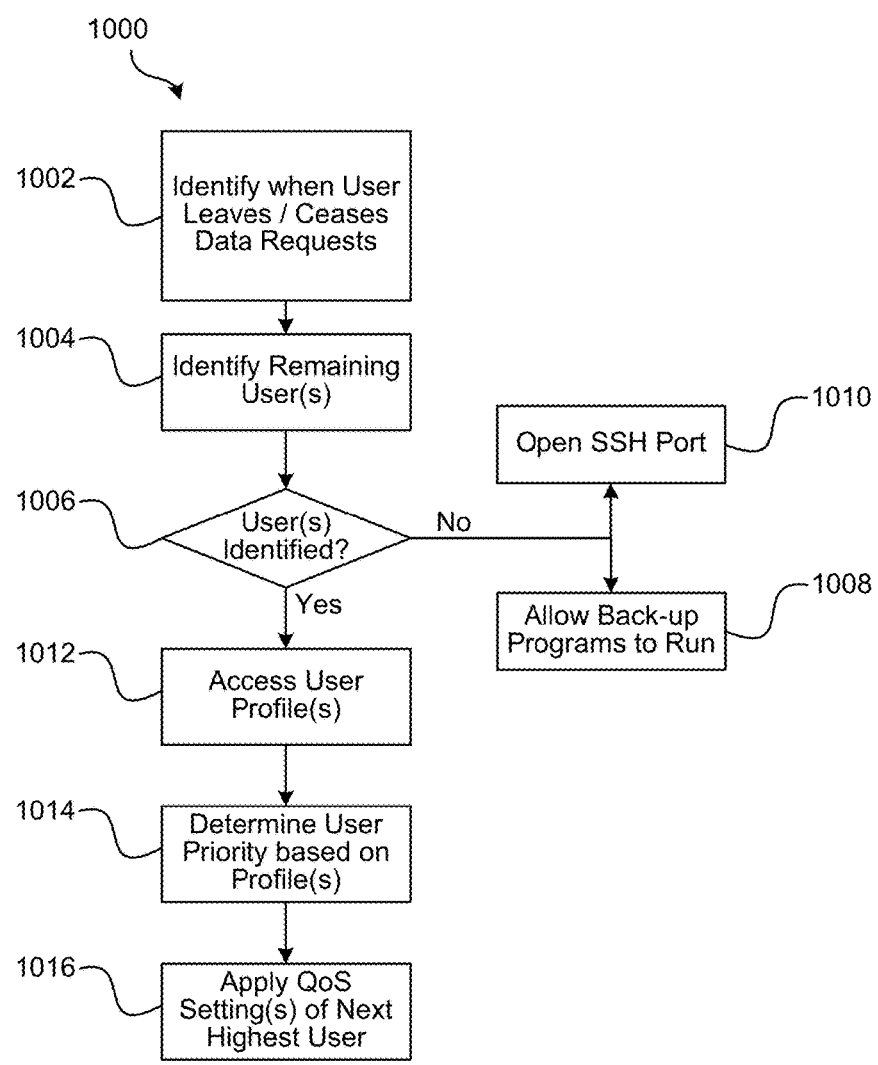
FIG. 10 illustrates another functional block diagram of a method of adapting settings based on user presence according to embodiments of the present disclosure.

FIG. 10 illustrates a functional block diagram of a method 1000 of adapting QoS settings based on user presence according to embodiments of the present disclosure. In block 1002, it may be identified when a user with the highest priority leaves the environment or the user's device no longer requests data from the router 102. Upon this user leaving, the remaining user(s) may be identified, illustrated as block 1004, and a decision may be made as to whether any user are actually present, illustrated as block 1006. If no users remain present in the environment, the QoS setting may be automatically adapted to allow and/or allocate bandwidth to allow back-up programs to run, illustrated as block 1008 and/or to open a secure shell (SSH) port, illustrated as block 1010, to allow one or more users to access data remotely via a device, or other activities. The back-up programs may include pre-caching/pre-downloading of content discussed previously as well as synchronizing user profile(s), updating settings or other activities. Although illustrated as running in the absence of user activity, the back-up programs may also run when users are present and user devices are being serviced by the router.

When there are users remaining in the environment, the profile(s) of the remaining users may be accessed, illustrated as block 1012, and a priority associated with each remaining user may be identified, illustrated as block 1014. The system may determine QoS settings to service the remaining users in order of priority and may operate the router in accordance with those settings, illustrated as block 1016. Thus, the operation and QoS settings of the router may dynamically change based on the user(s) that are present within the environment.

Figure 11:
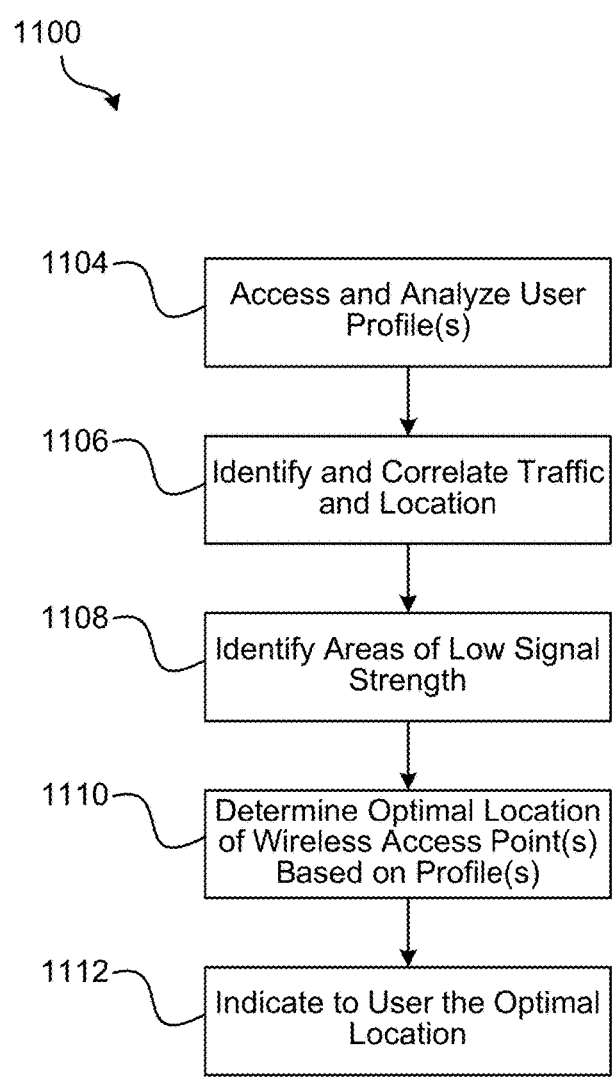
FIG. 11 illustrates a functional block diagram of a method of optimizing a location of a router according to embodiments of the present disclosure.

The present system, and the information collected therein in profiles, etc., may be used to perform other functions. For example, based on user behavior data and QoS measurements in different locations, the system may include and implement a network profile tool that allows a user to optimize wireless access points based on the user(s), signal strength and/or traffic. FIG. 11 illustrates a functional block diagram of a method 1100 of optimizing location of wireless access points according to embodiments of the present disclosure. In block 1104, the user profile(s) may be accessed and analyzed. The analysis may be performed to identify and correlate the amount of traffic, connection speed, and location of use within the environment of the router, illustrated as block 1106. Based on the analysis, areas of low signal strength may be identified, illustrated as block 1108. This may be used to generate a map of the signal strength at certain locations within the LAN or environment of the router. Based on the signal strength and the user profile(s), an optimal location for the wireless access points and/or the router may be determined, illustrated as block 1110. The optimal location may be selected to ensure good performance in areas of heavy use by user devices. Heavy use may defined in a number of ways, including time spent by a user in the location, amount of data transferred in the location, amount of data transferred to high priority users in the location, etc. This optimal location may then be indicated to one or more users, illustrated as block 1112, for example, via a message sent to a user device or other type of indication. Thus, based on the users, their location in which they tend to consume content, and their content traffic patterns, the optimal location of the router can be determined. The location may be different for different users and/or may be a location determined based on an average or consolidation of numerous users' profiles.

The system described may operate in a number of different environments. In one example, the router may be integrated into a home automation system. In this respect, the router may be able to identify when lights and other devices are turned on or off, temperature of the environment, the users present in the environment, etc. This allows the router to adapt the QoS settings in accordance with what is being done in the environment. For example, when the lights are off in the environment, the router may adapt the QoS settings to reprioritize actions to allow certain applications to download/upload content when the user/users are sleeping. Additionally, when the lights are turned back on, for example, indicating that one or more users are up, the router may adapt the QoS settings in accordance with the user profile(s) to allow the user(s) to access and/or perform actions through the network optimally.

The devices, systems, and method disclosed herein may be used to personalize QoS and optimize user experience through the router, and enable the user to optimize the location of the router as described above. In an aspect, the router may be configured to detect other devices that are connected to the router and identify the users of the devices, and implement one or more personalized QoS settings based on the identified users.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method, a system, or as an article of manufacture such as a memory device or non-transitory computer readable storage medium. The computer readable storage medium may be readable by a computer and/or router and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for optimizing operation of a router, comprising:
    determining a first identity of a first user within an environment, wherein the first identity is determined based on facial recognition using one or more cameras within the environment;
    accessing first quality of service settings corresponding to the first identity, the first quality of service settings comprising at least a first data throughput allotment from the router to devices being used by the first user;
    determining a first device being used by the first user, the first device being in communication with the router via a network;
    determining a second device being used by the first user, the second device being in communication with the router via the network;
    determining that the first user is focused on the first device at a first time;
    configuring the router, based on determining that the first user is focused on the first device at the first time, to prioritize communication of first data between the router and the first device higher than communication of second data between the router and the second device at the first time;

receiving, at a second time, image data indicating that the first user is facing the second device;

determining, at the second time and based on the image data, that the first user is focused on the second device; and configuring the router, based on determining that the first user is focused on the second device at the second time, to prioritize communication of the second data between the router and the second device higher than communication of the first data between the router and the first device.

2. The method of claim 1, wherein the first data comprises video data and the method further comprises:

decreasing a resolution of the video data at the second time.

3. The method of claim 1, further comprising:

determining a second identity of a second user within the environment;

determining a third device being used by the second user, the third device being in communication with the router via the network;

determining a first user priority associated with the first identity;

determining a second user priority associated with the second identity, the second user priority being lower than the first user priority; and prioritizing, at the first and second times, communication of the first and second data between the router and the respective first and second devices higher than communication of third data between the router and the third device, based on the second user priority being lower than the first user priority.

4. The method of claim 3, further comprising:

determining, at a third time, that the first and second devices are not being used by the first user;

determining that the second user priority is a highest remaining priority being serviced by the router;

accessing second quality of service settings corresponding to the second user; and prioritizing, at the third time, communication of the third data between the router and the third device in accordance with the second quality of service settings.

5. A method comprising:

identifying, by a router device, a first user in proximity to the router device;

determining, by the router device, one or more first quality of service settings based on an identity of the first user;

determining a first device being used by the first user, the first device being in communication with the router device via a network;

determining a second device being used by the first user, the second device being in communication with the router device via the network;

receiving, by the router device, a first request for transfer of first data to the first device;

receiving, by the router device, a second request for transfer of second data to the second device;

determining that the first user is focused on the first device at a first time;

configuring the router device, based on determining that the first user is focused on the first device, to prioritize the first request higher than the second request;

communicating, by the router device, the first data to the first device based on the one or more first quality of service settings;

receiving, at a second time, image data indicating that the first user is facing the second device;

determining, at the second time and based on the image data, that the first user is focused on the second device;

configuring the router device, based on determining that the first user is focused on the second device, to prioritize communication of the second data between the router device and the second device higher than communication of the first data between the router device and the first device; and communicating, by the router device, the second data to the second device based on determining that the first user is focused on the second device.

6. The method of claim 5, wherein the one or more first quality of service settings comprises a first metric relating to an order for transferring data via the router device, and wherein the first data is communicated according to the first metric.

7. The method of claim 5, further comprising determining a location of the first device, wherein the one or more first quality of service settings are further determined based on the location of the first device.

8. The method of claim 7, further comprising:

loading, from a profile, information showing that a signal strength for communications with the router device is below a threshold at the location; and altering the first data prior to the signal strength falling below the threshold.

9. The method of claim 5, further comprising:

identifying a second user in proximity to the router device;

determining a first user priority associated with the first user; and determining a second user priority associated with the second user, wherein the first user priority is higher than the second user priority.

10. The method of claim 9, further comprising:

receiving, by the router device, a third request for transfer of third data from a third device operated by the second user, wherein the third device is in communication with the router device via the network; and communicating, by the router device, the third data to the third device after communicating the first data to the first device and the second data to the second device.

11. The method of claim 5, further comprising:

detecting disconnection of the first device from the network;

identifying a second user in proximity to the router device;

determining, by the router device, one or more second quality of service settings based on the identity of the second user;

using, by the router device, the one or more second quality of service settings for communicating with a third device operated by the second user.

12. The method of claim 11, further comprising determining, prior to using the one or more quality of service settings, that the second user has a highest remaining priority being serviced by the router device.

13. The method of claim 5, further comprising:

detecting disconnection of the first device from the network;

identifying a third device in communication with the router device via the network;

determining, by the router device, one or more second quality of service settings associated with the third device;

using, by the router device, the one or more second quality of service settings for communicating with the third device.

14. A router device, comprising:

at least one processor;

a memory device including instructions operable to be executed by the at least one processor to perform a set of actions, configuring the at least one processor to:

identify a first user in proximity to the router device;

determine one or more first quality of service settings based on an identity of the first user;

determine a first device being used by the first user, the first device being in communication with the router device via a network;

determine a second device being used by the first user, the second device being in communication with the router device via the network;

receive a first request for transfer of first data to the first device;

receive a second request for transfer of second data to the second device;

determine that the first user is focused on the first device, wherein determining the first user is focused on the first device is based at least on receiving image data from a camera corresponding to the first user's face positioned towards the first device;

based on the determination that the first user is focused on the first device, configure the router to prioritize the first request higher than the second request; and communicate the first data to the first device based on the one or more first quality of service settings.

15. The router device of claim 14, wherein the one or more first quality of service settings comprises a first metric relating to an order for transferring data via the router device, and wherein the at least one processor is configured to communicate the first data is according to the first metric.

16. The router device of claim 14, wherein the at least one processor is further configured to determine a location of the first device, wherein the one or more first quality of service settings are further determined based on the location of the first device.

17. The router device of claim 16, wherein the at least one processor is further configured to:

load, from a profile, information showing that a signal strength for communications with the router device is below a threshold at the location; and alter the first data prior to the signal strength falling below the threshold.

18. The router device of claim 14, wherein the at least one processor is further configured to:

identify a second user in proximity to the router device;

determine a first user priority associated with the first user; and determine a second user priority associated with the second user, wherein the first user priority is higher than the second user priority.

19. The router device of claim 18, wherein the at least one processor is further configured to:

receive a third request for transfer of third data from a third device operated by the second user, wherein the third device is in communication with the router device via the network; and communicate the third data to the second device after communicating the first data to the first device and the second data to the second device.

20. The router device of claim 14, wherein the at least one processor is further configured to:

detect disconnection of the first device from the network;

identify a second user in proximity to the router device;

determine one or more second quality of service settings based on the identity of the second user;

use the one or more second quality of service settings for communicating with a third device operated by the second user.

21. The router device of claim 20, wherein the at least one processor is further configured to determine, prior to using the one or more quality of service settings, that the second user has a highest remaining priority being serviced by the router device.

22. The router device of claim 14, wherein the at least one processor is further configured to:

detect disconnection of the first device from the network;

identify a third device in communication with the router device via the network;

determine one or more second quality of service settings associated with the third device;

using the one or more second quality of service settings for communicating with the third device.

\* \* \* \* \*